Jan. 13, 1959  R. C. CALCUT  2,868,489
FASTENER ASSEMBLY AND CLIP THEREFOR
Filed March 1, 1954
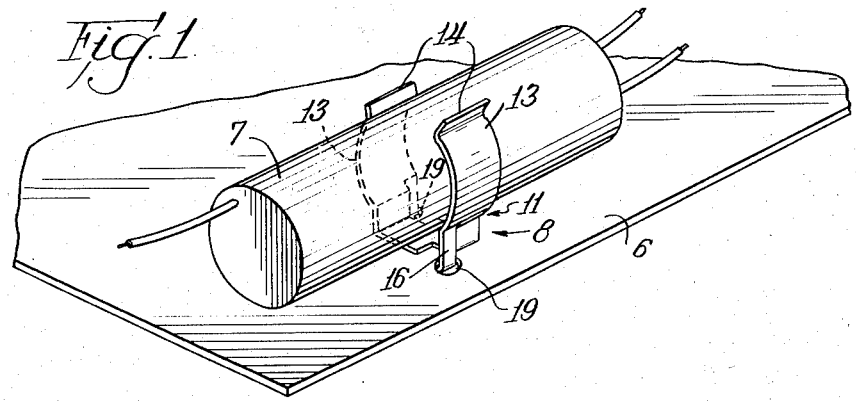
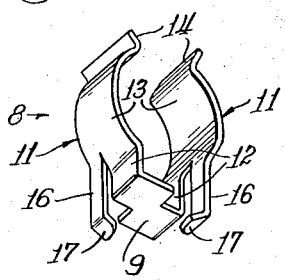
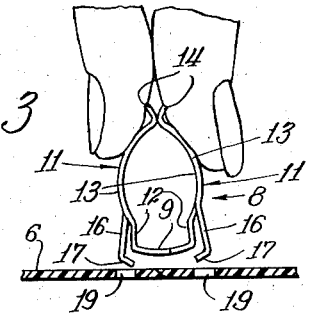
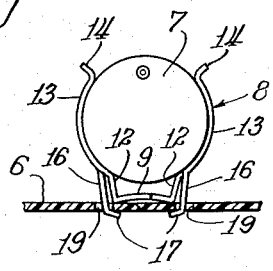
INVENTOR.
Robert C. Calcut
BY
J. D. Douglas
atty

United States Patent Office 2,868,489
Patented Jan. 13, 1959

2,868,489

FASTENER ASSEMBLY AND CLIP THEREFOR

Robert C. Calcut, Chicago, Ill., assignor to Admiral Corporation, Chicago, Ill., a corporation of Delaware Application March 1, 1954, Serial No. 413,265

3 Claims. (Cl. 248—223)

This invention relates to spring fastener assembly and to a clip therein for supporting an object from a plate. More specifically, the invention contemplates a clip capable of being resiliently coupled to a mounting plate at a pair of apertures therein and to embrace the periphery of a cylindrical object for securing it to the plate, the holding of the object increasing the security of connection of the clip to the plate.

A specific use of this invention is in connection with electronic equipment where it is desired to support such objects as a fixed condenser from the chassis.

An advantage of the novel clip is that it may be rapidly manufactured from a continuous band of resilient metallic stock. The object provided can be applied to a panel and to then secure a cylindrical object to said panel, the installations being capable of being carried out quickly and by unskilled labor.

Other advantages of the invention will be set forth in part hereinafter and in part will be obvious herefrom, or may be learned by practice with the invention, the same being realized and attained by means of the instrumentalities and combinations pointed out in the appended claims.

The accompanying drawings, referred to herein and constituting a part hereof, illustrate one embodiment of the invention and together with the description serve to explain the principles.

In the drawings:

Fig. 1 is a fragmentary perspective view of the novel clip as it is employed to support a condenser from a mounting plate;

Fig. 2 is a perspective view of the clip per se as viewed from below the level thereof;

Fig. 3 is an end elevation of the clip preparatory to its association with the support plate;

Fig. 4 is also an end elevation of the clip, associated with the plate when in readiness to receive the cylinder into association therewith; and Fig. 5 is also an end elevational view showing the status of the fastener when it is securing the cylinder to the mounting plate.

In Fig. 1 is shown a portion of a mounting or support plate 6, which may be a metallic chassis or the conductor-bearing plate of a so-called printed circuit. The plate 6 may also support a cylindrical component such as a condenser 7. And this may be efficiently carried out by a novel clip or fastener which will be indicated in its entirety by the character 8. Features of the clip are provided by its formation from a continuous band of some suitable metal such as spring steel.

In detail, the structure of the clip 8 includes a normally flat base or abutment portion 9 from opposed edges of which a pair of gripping members 11 extend upward. The members 11 include parts 12, normal to the portion 9 and arcuate or outwardly bowed portions 13 continuing from the flanges. The upper ends of the portions 13 carry a pair of outwardly diverging cam parts 14.

For securing it to the plate 6, the clip 9 is provided with novel anchor means. It involves a pair of downwardly extending arms or draft members 16 struck from the clip and which may extend to a level slightly below that of the base 9. From the lower ends of the arms 16, lower hook cams or anchor portions 17 extend at an angle. The free ends are spaced less than the distance between the adjacent edges of a pair of apertures 19 in the plate 6. The cams or hooks are therefore incapable of being concurrently inserted in the apertures, when the clip is in a state of relaxation. Each of the arms 16 and portions thereof 17 is formed to enable it to slide freely through either of the apertures. The pair of cams 17 may be concurrently inserted in the apertures, however, if the clip is operatively deflected the effectiveness of which is augmented by the location of the junction of arms 16 with the remainder of the clip and the points thereon where force is applied to produce the deflection. The force may best be manually applied in the vicinity of the upper parts 14 (Fig. 3) to pinch the upper ends of the attaching members 11 to each other thereby bending the attaching members 11 and abutment 9. The arms 16 not being deflected by the operation, the cams 17 are carried away from each other adequately for their tips to clear the edges of apertures 19 into which the cams and draft members are passed downward until the base 9 engages the plate 6. Then the pinching effort on the cams 14 is relaxed.

While the arms 16 may extend from any spaced-apart pair of points on either side of the center of abutment 9, it is preferable that they be arranged to extend from points on the bowed portions 13 so that when the arms 16 are anchored to the plate 6, as will later be described, said arms are effective as guy members to resist rocking of the clip about the center of the abutment. Moreover, to attain maximum spacing of the arms 16 consistent with a minimum of room occupied by the base of the clip said arms are arranged at diagonally opposite corners of the clip, as indicated particularly in Fig. 2. It will be appreciated however that these arms could very well be in the form of tongues struck from the mid portion of the clips and that they do not necessarily have to be at the edge.

Once the base 9 is brought into association with the plate 6, as indicated, the hook cams 17 extend from and slightly under adjacent lower edges of the apertures 19 (Fig. 4). And in order to better understand the relationship of the cams to the edges it should be noted (Fig. 2) that the width of the arms 16 is considerably less than the remaining width of the clip. Therefore, following relaxation of the manual pinching effort, the arms 16 are deflected, due to the comparative stiffness of the remaining width, thereby biasing the cams 17 against the lower edges with which said cams cooperate to draw the base with moderate force into engagement with plate 6, the moderate forces being adequate for initially securing the clip to the plate.

When the clip 8 performs the operation of securing the condenser 7 to the base 6, the arms 16 are increasingly deflected thereby greatly augmenting the biased effect of the cams 17 on the edges of apertures 19. To create this effect, the condenser 7 is positioned between the bowed portions 13 by pressing it downward against the cams 14 (Fig. 4) thereby spreading said cams apart until they are passed by the condenser and it is in the grip of said portions 13 since the portions remain under deflection by the condenser. The pressure of the cams 17 is in a direction edgewise of the plate 6 although the operation of the cams provided a component acting normal to the plate. The latter force is, of course, conveyed to the abutment 9 by the draft members 16 to at first provide engagement of the abutment with the plate and then a clamped relationship between said abutment and plate when the condenser is held between the attaching members.

While I have described one embodiment of my invention, I am aware that numerous and extensive departures may be made therefrom without departing from the spirit or scope of the invention.

I claim:

1. In combination, a mounting plate having inner and outer faces and having a pair of spaced openings therein which have mutually adjacent edges, and a one-piece clip mounted on said plate at said openings, said clip comprising a base which engages the outer face of the plate between said openings, a pair of resilient flexible gripping members connected to opposite ends of said base and extending therefrom outward away from said outer face of the mounting plate, said members having portions disposed outward from the base which are oppositely bowed away from each other to receive a supported element between them, resilient arms connected respectively to said gripping members outward from the base, said arms extending from their respective connections to said gripping members inward beyond said base and through the respective openings in the mounting plate, said arms at the inner face of the mounting plate having spaced transverse protrusions which extend toward each other and engage the inner face of the mounting plate at said mutually adjacent edges of said openings to retain the clip on the mounting plate, said transverse protrusions extending toward each other beyond the mutually adjacent edges of said openings, and said arms being stressed by the engagement of said protrusions against the inner face of the mounting plate at said mutually adjacent edges of said openings to bias the base of the clip against the outer face of the mounting plate between said openings.

2. A one-piece clip comprising a base, a pair of resilient flexible gripping members connected to opposite ends of said base and extending outward therefrom, said gripping members having portions disposed outward from the base which are oppositely bowed away from each other to receive a supported element between them, and resilient arms connected respectively to diagonally opposite portions of said gripping members outward from the base, said arms extending from their respective connections to said gripping members inward beyond said base, said arms having spaced transverse protrusions disposed inwardly beyond the base which extend toward each other.

3. The clip of claim 2, wherein said base is flexible and resilient, and each of said gripping members is of reduced size between its connection to the base and its connection to the corresponding resilient arm to facilitate bending of the gripping member between said connections.

References Cited in the file of this patent

UNITED STATES PATENTS

| | | |
|---|---|---|
| 1,023,077 | Grout | Apr. 9, 1912 |
| 2,166,916 | Lombard | July 18, 1939 |
| 2,267,586 | Del Camp | Dec. 23, 1941 |
| 2,469,451 | Burrus | May 10, 1949 |
| 2,541,828 | Peck | Feb. 13, 1951 |
| 2,682,693 | Poupitch | July 6, 1954 |
| 2,689,992 | Flora | Sept. 28, 1954 |